(12) United States Patent
Dunlap et al.

(10) Patent No.: US 9,517,487 B2
(45) Date of Patent: Dec. 13, 2016

(54) POSITIVE DISPLACEMENT DISPENSER AND METHOD FOR DISPENSING DISCRETE AMOUNTS OF LIQUID

(71) Applicant: Nordson Corporation, Westlake, OH (US)

(72) Inventors: David J. Dunlap, Rehoboth, MA (US); Laurence B. Saidman, Duluth, GA (US); Edward C. Taylor, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 14/228,642

(22) Filed: Mar. 28, 2014

(65) Prior Publication Data

US 2014/0209626 A1    Jul. 31, 2014

Related U.S. Application Data

(63) Continuation of application No. 13/283,702, filed on Oct. 28, 2011, now Pat. No. 8,708,246.

(51) Int. Cl.
*B05C 5/02* (2006.01)
*B05C 11/10* (2006.01)
*G01F 11/02* (2006.01)

(52) U.S. Cl.
CPC ........... *B05C 5/0291* (2013.01); *B05C 5/0225* (2013.01); *B05C 11/1034* (2013.01); *G01F 11/021* (2013.01); *G01F 11/029* (2013.01)

(58) Field of Classification Search
CPC .............. B05B 1/02; B05B 1/30; B67D 3/00; B05C 5/0225; B05C 5/0291; B05C 11/1034
See application file for complete search history.

(56) References Cited

U.S. PATENT DOCUMENTS

| | | |
|---|---|---|
| 574,102 A | 12/1896 | Miller |
| 4,116,389 A | 9/1978 | Furtah et al. |
| 4,763,560 A | 8/1988 | Sasaki |
| 4,830,286 A | 5/1989 | Asslaender et al. |
| 4,930,669 A | 6/1990 | Dickau et al. |
| 5,186,393 A | 2/1993 | Yie |

(Continued)

FOREIGN PATENT DOCUMENTS

| | | |
|---|---|---|
| DE | 10010952 A1 | 9/2001 |
| EP | 1353104 A1 | 10/2003 |

(Continued)

OTHER PUBLICATIONS

U.S. Patent and Trademark Office, Final Office Action in U.S. Appl. No. 13/219,064, May 5, 2014.

(Continued)

*Primary Examiner* — Ryan Reis
(74) *Attorney, Agent, or Firm* — Baker & Hostetler LLP

(57) ABSTRACT

A dispenser for applying small amounts of liquid to a substrate. The dispenser includes a dispenser body, an actuator in the dispenser body, and a dispensing element including a dispensing element body removably coupled to the dispenser body. A valve stem is mounted for reciprocating movement within the dispensing element body. Additional aspects include a deformable valve seat, a deformable and resilient valve stem tip and a method of applying liquid in discrete amounts to a substrate.

10 Claims, 8 Drawing Sheets

(56) References Cited

U.S. PATENT DOCUMENTS

| | | | |
|---|---|---|---|
| 5,320,250 A | 6/1994 | La et al. | |
| 5,447,254 A * | 9/1995 | Hoover et al. | 222/1 |
| 5,484,104 A | 1/1996 | Kukler | |
| 5,720,417 A | 2/1998 | Wurth et al. | |
| 5,740,963 A | 4/1998 | Riney et al. | |
| 5,747,102 A * | 5/1998 | Smith et al. | 427/98.4 |
| 5,913,455 A * | 6/1999 | La et al. | 222/55 |
| 5,927,329 A | 7/1999 | Yie | |
| 6,060,125 A | 5/2000 | Fujii | |
| 6,164,568 A | 12/2000 | Muller et al. | |
| 6,253,957 B1 * | 7/2001 | Messerly et al. | 222/1 |
| 6,270,019 B1 * | 8/2001 | Reighard | 239/1 |
| 6,557,452 B1 | 5/2003 | Morroney et al. | |
| 6,601,784 B2 | 8/2003 | Muller-Girard, Jr. et al. | |
| 6,622,983 B2 | 9/2003 | Hall | |
| 6,968,856 B1 | 11/2005 | Goza | |
| 7,018,477 B2 | 3/2006 | Engel | |
| 7,032,839 B2 | 4/2006 | Blette et al. | |
| 7,694,855 B2 | 4/2010 | Chastine et al. | |
| 7,762,088 B2 * | 7/2010 | Fiske et al. | 62/3.64 |
| 7,789,327 B2 | 9/2010 | Micheli et al. | |
| 7,980,483 B2 | 7/2011 | Stretch | |
| 8,074,467 B2 | 12/2011 | Fiske et al. | |
| 2001/0007354 A1 | 7/2001 | Tokuda et al. | |
| 2003/0000965 A1 | 1/2003 | Bach et al. | |
| 2004/0140371 A1 | 7/2004 | Engel | |
| 2006/0157517 A1 | 7/2006 | Fiske et al. | |
| 2007/0069041 A1 | 3/2007 | Quinones et al. | |
| 2007/0145164 A1 | 6/2007 | Ahmadi et al. | |
| 2009/0004027 A1 | 1/2009 | Ingenbleek et al. | |
| 2009/0095825 A1 | 4/2009 | Ahmadi et al. | |
| 2009/0101669 A1 * | 4/2009 | Hassler et al. | 222/1 |
| 2010/0294810 A1 * | 11/2010 | Ikushima | 222/420 |
| 2011/0017841 A1 | 1/2011 | Holm et al. | |
| 2013/0048759 A1 | 2/2013 | Aguilar et al. | |

FOREIGN PATENT DOCUMENTS

| | | |
|---|---|---|
| EP | 1243342 B9 | 6/2009 |
| EP | 2151282 A1 | 2/2010 |
| JP | H0188413 | 6/1989 |
| JP | H0328370 | 3/1991 |
| JP | H0459865 | 5/1992 |
| JP | H0622668 | 3/1994 |
| JP | H0821539 | 1/1996 |
| JP | 2001507987 | 6/2001 |
| JP | 2001193846 A | 7/2001 |
| JP | 2002361123 | 12/2002 |
| JP | 2007516833 A | 6/2007 |
| KR | 100704286 B1 | 3/2007 |
| WO | 2008124770 A1 | 10/2008 |

OTHER PUBLICATIONS

All Ring Co., All Ring Dual Solenoid Jet Valve, 2006, 3 pgs.

European Patent Office, European Search Report in EP Application No. 12189794, Jul. 24, 2013.

U.S. Patent and Trademark Office, Non-final Office Action in U.S. Appl. No. 13/219,064, Jan. 22, 2014 (10 pages).

Japanese Application No. 2012-236621: Notice of Reasons for Refusal dated Oct. 31, 2016, 4 pages.

* cited by examiner

POSITIVE DISPLACEMENT DISPENSER AND METHOD FOR DISPENSING DISCRETE AMOUNTS OF LIQUID

CROSS-REFERENCE TO RELATED APPLICATIONS

This application is a continuation of application Ser. No. 13/283,702, filed Oct. 28, 2011 (pending), the disclosure of which is hereby incorporated by reference herein in its entirety.

TECHNICAL FIELD

The present invention generally relates to liquid dispensers, such as positive displacement pumps and jetting dispensers, designed to accurately dispense discrete amounts of liquid.

BACKGROUND

Various types of industrial liquid dispensing applications have requirements related to dispensing small, discrete amounts of liquid while achieving high degrees of accuracy, uniformity and/or repeatability during successive and often rapid dispense cycles. Positive displacement pumps are used to achieve at least some of these purposes. However, various applications require dispense amounts, cycle times and other process parameters that typical positive displacement pumps cannot meet. On the other hand, apparatus that can meet these other process parameters may not dispense with the required accuracy, repeatability and/or uniformity. For example, dispensers may utilize elements that are acted upon by air pressure or mechanical devices, such as stepper drives, at a location remote from the point of application. Under these circumstances, the deposition amount or volume of discharged liquid can vary depending on a number of factors. This may require that the user continually adjust system settings in order to maintain uniform application rates. Even so, the desired or required degree of accuracy and uniformity may not be achieved. In addition, the size of a desired liquid deposition is often very small, such as on the order of $10^{-7}$ in.$^3$ or less, and this can create process control issues. Also, many of the materials that are used in industry are curable or hardenable materials, such as epoxies, which can create additional challenges related to maintenance.

Various forms of jetting dispensers are known and have been used successfully to dispense small amounts of viscous liquids with a high degree of accuracy, uniformity and repeatability. Challenges that remain with regard to jetting technology include the challenge of maintaining the inner components and passages clear of residual liquid material between dispense operations so that repeated use of the jetting dispenser can occur without any negative effects of cured or hardened material within the device. In addition, there are times when liquid satellite formation is a problem. This involves the formation of additional small amounts of the liquid around the dispensed amount. Satellite formations and/or undesired atomization may negatively affect the deposition pattern that is desired on the intended substrate. Finally, leakage of liquid from the outlet of a jetting dispenser between dispense cycles can be a problem.

It would therefore be desirable to provide a liquid dispenser that addresses concerns such as those mentioned above, and can lessen the need to clean various components and passages, lessen satellite formation and atomization, and prevent leakage of liquid from the dispensing outlet between dispense cycles.

SUMMARY

In one illustrative embodiment, a dispenser for applying small amounts of liquid to a substrate is provided and generally comprises a dispenser body, an actuator in the dispenser body, and a dispensing element. The dispensing element includes a dispensing element body removably coupled to the dispenser body and a valve stem mounted for reciprocating movement within the dispensing element body. The dispensing element body further includes a liquid chamber. The valve stem includes a tip mounted for reciprocating movement within the liquid chamber between open and closed positions. The dispensing element further includes a valve seat engaging the valve stem tip in the closed position, as well as a liquid dispensing outlet and a liquid supply passage. The valve seat is positioned between the liquid chamber and the liquid dispensing outlet. The liquid supply passage communicates with the liquid chamber. The valve stem further includes an opposite end relative to the tip. The opposite end of the valve stem is adapted to be operatively coupled to the actuator when the dispensing element is coupled to the dispenser body. Because the dispensing element is removable from the dispenser body and includes the various passages for the liquid, and also includes the valve stem, the dispensing element may be discarded and replaced by a new dispensing element as necessary to avoid maintenance and/or contamination concerns associated with residual liquid.

The dispensing element body in various embodiments may have additional features. For example, the dispensing element body includes an air supply passage and an air discharge passage communicating with the air supply passage. The air discharge passage is positioned adjacent to the liquid dispensing outlet and is adapted to discharge a pressurized air curtain surrounding the liquid as the liquid is dispensed from the liquid dispensing outlet. This feature can lessen the occurrence of liquid atomization and/or effect of satellite liquid formations around the liquid discharge from the outlet. The dispensing element body further includes a connector element adapted to couple with a container or reservoir of the liquid, such as a removable container typically used with syringe-type dispensers. The dispenser body further includes an opening adapted to receive an outlet portion of the container and the connector element is positioned in the opening when the dispensing element body is coupled to the dispenser body. The dispensing element body may comprise a plastic material for disposability and/or other purposes.

The valve seat, in additional or alternative embodiments, can further comprise a separate element carried by the dispensing element body. In one embodiment, the valve seat is malleable and deformed by the valve stem tip in the closed position. The plastic material of the dispensing element body can also be deformed as the valve stem tip engages the overlying malleable valve seat. The combined deformation of the valve seat and the underlying material of the dispensing element body achieves at least two purposes. It can damp the impact of the valve stem tip against the valve seat and also increase the amount of contact between the valve stem tip and the valve seat. Specifically, a concave area of sealing contact is formed between the valve stem tip and the valve seat. This increases the sealing effect of the valve stem tip. The damping action can reduce the formation and/or amount of liquid satellite formation or atomization of the dispensed liquid. The valve seat further comprises a cone shaped portion for engaging the valve stem tip and an elongate dispensing tip portion including a liquid dispensing passage communicating with the liquid dispensing outlet. A securing cap is removably coupled to the dispenser body and secures the dispensing element to the dispenser body. The securing cap includes an opening that receives the elongate dispensing tip portion of the valve seat. The opening further communicates with the air discharge passage and is configured to direct the pressurized air curtain in surrounding relation to the liquid as the liquid is dispensed from the liquid dispensing outlet.

The dispensing element further comprises a dynamic seal engaged with the valve stem. The dynamic seal prevents the escape of liquid from the liquid chamber during operation of the dispenser. The valve stem extends through the dynamic seal such that the opposite end of the valve stem is positioned outward of the liquid chamber and in operative engagement with the actuator. A spring element is coupled with the dispensing element body and the valve stem for biasing the opposite end of the valve stem into proper position, such as in engagement with the actuator.

In another alternative or additional aspect of the invention, a dispenser for applying small amounts of liquid to a substrate is provided and generally includes a dispensing portion, an actuator portion, and a valve stem mounted for reciprocating movement within the dispensing portion. The dispensing portion further includes a liquid chamber and the valve stem includes a tip mounted for reciprocating movement within the liquid chamber between open and closed positions. The dispenser further includes a valve seat in the dispensing portion. The valve stem tip engages the valve seat in the closed position. The dispensing portion further includes a liquid dispensing outlet and a liquid supply passage. The valve seat is positioned between the liquid chamber and the liquid dispensing outlet. The liquid supply passage communicates with the liquid chamber. The valve stem is operatively coupled to the actuator such that the actuator is capable of moving the valve stem between the open and closed positions. The valve seat is formed by a first, malleable material in abutting contact with a second, deformable material. The first and second materials are deformed when the valve stem moves to the closed position. This damps the impact of the valve stem tip against the valve seat and forms an area of sealing contact between the valve stem tip and the valve seat.

The first, malleable material can further comprise a metal, while the second, deformable material may further comprise a plastic material. For example, the metal material may be a thin and ductile stainless steel sheet material and the plastic may be polypropylene. The valve stem tip may be rounded such that upon impact when reaching the closed position, the valve stem tip plastically deforms the metal and the underlying plastic to create an annular, concave ring in the valve seat. This annular concave ring forms an effective sealing area, while also providing a damping effect.

In another alternative or additional aspect, the dispenser may be generally constructed as discussed above. This embodiment employs a valve stem tip that is formed from a deformable, resilient material. In this embodiment, the valve stem tip is deformed against the valve seat when the valve stem moves to a closed position. This provides both a damping effect upon impact of the valve stem tip against the valve seat and forms a larger area of sealing contact between the valve stem tip and the valve seat than would otherwise be formed with a rigid valve stem tip and rigid valve seat. In this embodiment, the valve seat may be formed from a rigid material that is not deformed when impacted by the valve stem tip. The valve stem may further include a main portion coupled with the tip and formed from a rigid metal, while the tip can be formed from an elastomeric material which deforms in a resilient manner.

A method of applying a small amount of liquid to a substrate during a dispense cycle is also provided. The liquid is dispensed from a dispenser including a valve stem with a tip, a liquid chamber, a liquid dispensing passage communicating with a liquid dispensing outlet, and a valve seat positioned between the liquid chamber and the liquid dispensing passage. The method includes moving the valve stem tip from a closed positioned which is engaged with the valve seat to an open position which is disengaged and spaced from the valve seat. Pressurized liquid is allowed to flow from the liquid chamber past the valve stem tip and into the liquid dispensing passage. The valve stem tip is then moved from the open position to the closed position thereby forcing a discrete amount of liquid onto the substrate. The valve stem tip is maintained in the closed position until an initiation of a subsequent dispense cycle. In this manner, liquid from the liquid dispensing outlet is prevented from leaking out of the outlet between dispense cycles.

Various additional features and advantages of the invention will become more apparent upon review of the following detailed description of the illustrative embodiments taken in conjunction with the accompanying drawings.

DETAILED DESCRIPTION OF THE ILLUSTRATIVE EMBODIMENTS

Figure 1:
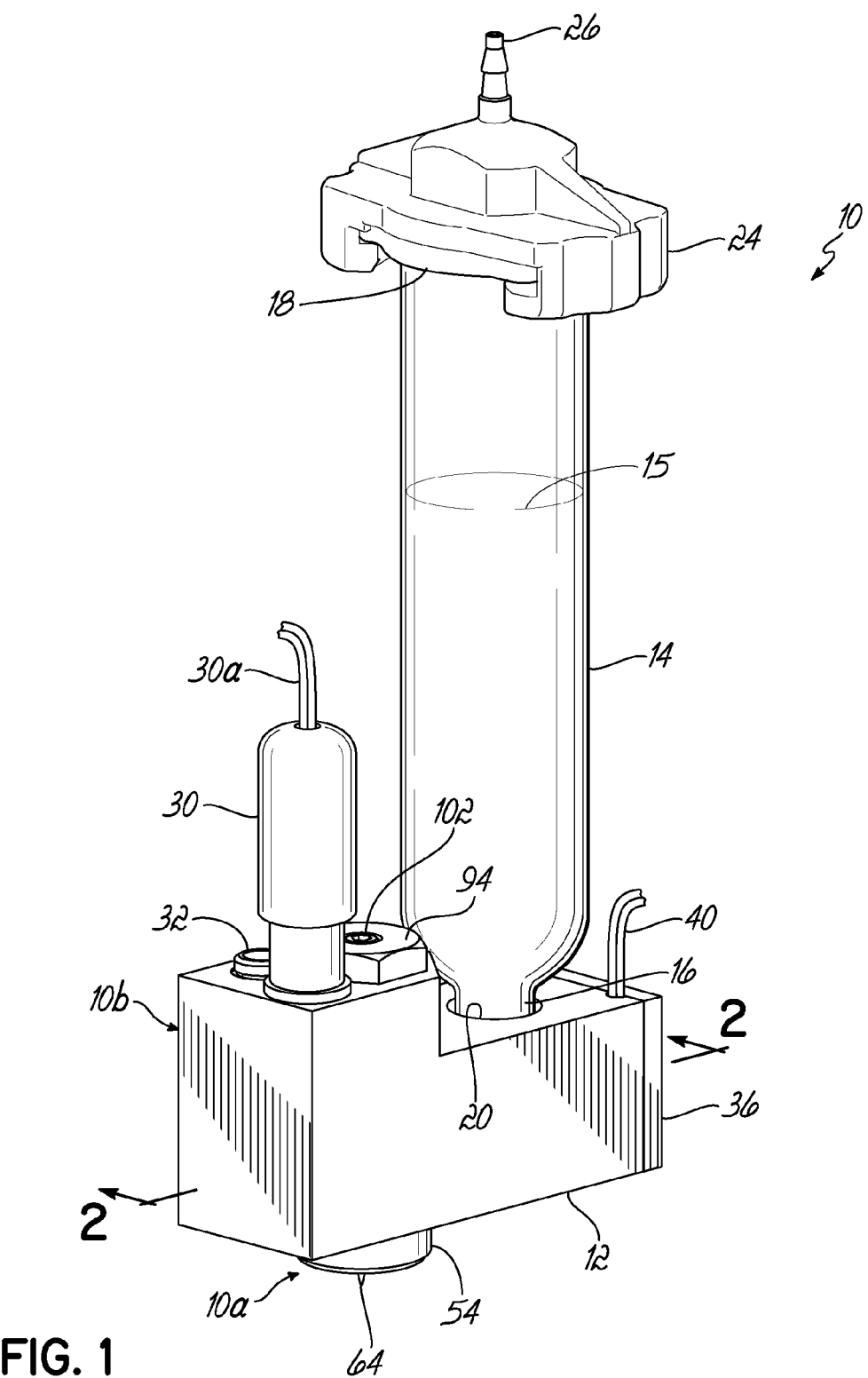
FIG. 1 is a perspective view of a dispenser constructed in accordance with one illustrative embodiment of the invention.
Figure 2:
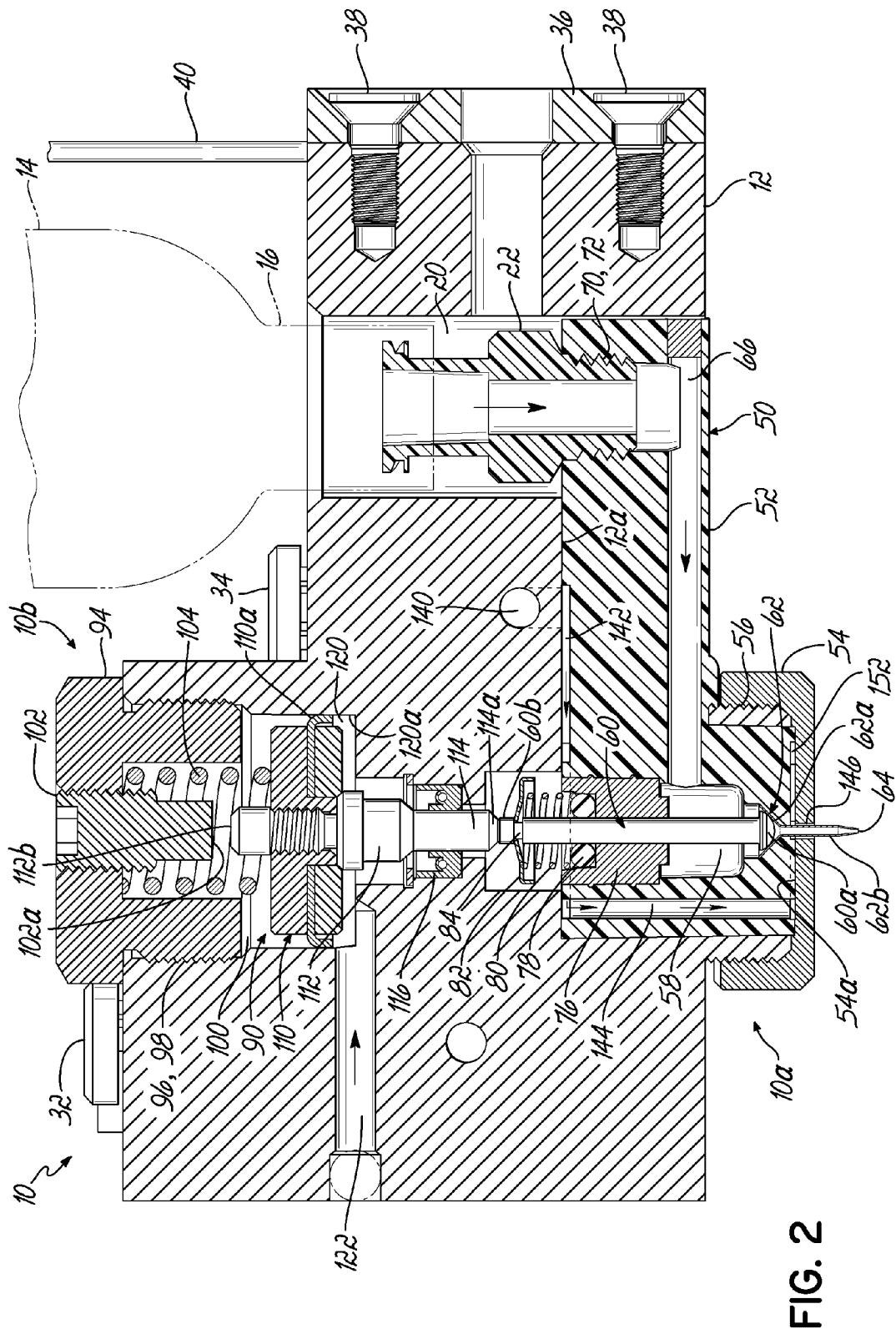
FIG. 2 is a cross sectional view of the dispenser shown in FIG. 1, generally taken along line 2-2.

FIGS. 1 and 2 illustrate a dispenser 10 constructed in accordance with one illustrative embodiment. It should be noted that various spatial and directional references, such as horizontal, vertical, upper, lower, etc. are used with regard to describing the drawing figures and that this is done for convenience and clarity of description only. It will be understood that the dispenser 10 may be used in various orientations and may dispense a variety of liquids having a wide range of viscosities such as alcohols with viscosities less than water and epoxy resins with viscosities well above that of water. The dispenser 10 generally comprises a dispensing portion 10a and an actuator portion 10b, and these portions are associated with a dispenser body 12 in the illustrative embodiment. The dispenser 10 further includes a container or reservoir 14 of the liquid 15 to be dispensed. The container 14 is removably coupled to the dispenser body 12. The container 14 includes a first end 16 and second end 18. The first end 16 is received with an opening 20 and is coupled with a connector 22, as will be described further below. The second end 18 includes an additional connector 24 with a fluid fitting 26 for coupling to tubing (not shown). The container 14 holds the liquid 15 to be dispensed as well as a piston (not shown). The piston is moved to pressurize the liquid 15 by introducing pressurized air on an upper side of the piston through the fitting 26. The liquid 15 in the container 14 may be under a relative low pressure of, for example, 10 psi. This exemplary syringe-type container 14 is more fully shown and described in U.S. Patent Publication No. 2007/0287965, the disclosure of which is hereby fully incorporated by reference herein. As further shown in FIG. 1, a solenoid valve 30 and associated wiring 30a is coupled to and extends within the dispenser body 12 and controls pressurized actuation air, as will be described further below. The actuation air is received through a fitting 32 and is directed through one or more passages (not shown) leading to the portion of the solenoid valve 30 contained in the dispenser body 12. An additional fitting 34 (FIG. 2) receives pressurized process air into the dispenser body 12 also as described further below. For applications requiring heated liquid and process air, the dispenser body 12 contains a cartridge-style heater and resistance temperature detector or RTD (not shown). These may be accessed by removing a cap 36 secured with fasteners 38. The wiring 40 for the heater and RTD is shown in FIGS. 1 and 2. It will be appreciated that the dispenser body 12 may be heated to and controlled at the required application temperature by other suitable methods instead. The dispenser body 12 is formed from a heat conductive material, such as aluminum.

Referring more specifically to FIG. 2, a dispensing element 50, including a dispensing element body 52, is removably coupled to the dispenser body 12 by a threaded cap 54 received on a threaded extension 56 of the dispenser body 12. The dispensing element body 52 includes a liquid chamber 58 and a valve stem 60 having a tip 60a and mounted for reciprocating movement within the liquid chamber 58 between open and closed positions. The tip 60a may be integrally formed with the remainder of the valve stem 60, or may be a separate part secured to the remainder of the valve stem. In this embodiment, the tip 60a is formed from Viton having a Shore A hardness of 50. The closed position is shown in FIG. 2. The dispensing element 50 further comprises a valve seat 62 engaging the valve stem tip 60a in the closed position. The valve seat 62, in this illustrative embodiment, comprises an elongate element having a cone or funnel shaped portion 62a and a tubular dispensing tip portion 62b integral with and extending from the cone shaped portion. A liquid dispensing outlet 64 is located at the end of the tubular dispensing tip 62b. A liquid supply passage 66 is in fluid communication with the liquid chamber 58 and also with the connector 22 coupled in fluid communication with the container 14. Pressurized liquid 15 therefore flows from the container 14 through the connector 22 and the liquid supply passage 66 into the liquid chamber 58. When the valve stem 60 is in the closed position as shown in FIG. 2, the liquid 15 is prevented from discharging through the outlet 64. It will be appreciated that the connector 22 may be part of the container 14 or may be part of the dispensing element 50. Respective threads 70, 72 are used between the connector 22 and the dispensing element body 52 for maintaining a fluid tight connection.

The dispensing element 50 further includes a valve stem guide element 76 and a dynamic seal 78, as well as a spring element 80 and spring retainer 82 that is snapfit into a groove 84 proximate an end 60b of the valve stem 60 opposite to the valve stem tip 60a. The actuator portion 10b of the dispenser 10 comprises an actuator 90. The end 60b of the valve stem 60 is adapted to be moved by the actuator 90. The actuator 90 is retained by a cap 94 with threads 96 on the outside of the cap 94 engaging threads 98 in an opening 100 of the dispenser body 12. The cap 94 further includes a adjustment screw 102 and a coil spring 104. The coil spring 104 maintains the valve stem 60 in a normally closed position. The spring 104 bears against a piston 110 fixedly mounted to an end of an actuating element 112. The actuating element 112 includes a cylindrical end portion 114 adjacent to the end 60b of the valve stem 60. The end portion 114 slides within a dynamic seal 116 mounted in the dispenser body 12 to seal a piston chamber 120 that receives the piston 110. Pressurized air is introduced into an air supply passage 122 from the air fitting 32 by switching the solenoid valve 30 (FIG. 1). The air is directed to the underside of the piston 110 within the piston chamber 120. Introducing air to the underside of the piston 110 will raise the piston 110 and the attached actuating element 112 against the spring bias of the coil spring or return spring 104 thereby compressing the spring 104. This will allow the valve stem 60 to move to the open position due to the bias provided by the spring element or coil spring 80 associated with the dispensing element 50 while, in this embodiment, maintaining engagement of the upper end 60b of the valve stem 60 with the lower end 114a of the actuating element 112. In other embodiments, such as when additional closing force is necessary for dispensing more viscous liquids, the lower end 114a of the actuating element 112 may be spaced from the upper end 60b of the valve stem when the valve stem 60 is in the open position. When the actuating air is exhausted from the air supply passage 122 and the piston chamber 120 on the underside of the piston 110 by again switching the solenoid valve 30 (FIG. 1), the return spring 104 will force the piston 110, the attached actuating element 112 and the valve stem 60, which is engaged with the end of the actuating element 112, downward such that the valve stem tip 60a engages the valve seat 62. It will be appreciated that other actuators may be used instead, such as pistons operated in both directions by pressurized air or electric actuators.

The adjustment screw 102 is used to set the stroke length of the valve stem 60 which may, for example, be 0.010" to 0.020". Specifically, the adjustment screw 102 is rotated and driven downward until the valve stem tip 60a stops against the valve seat 62. Then, the screw 102 is rotated in the opposite direction and backed out of the cap 94 to achieve the desired stroke length. When pressurized actuation air is introduced into the supply passage 122 and the piston chamber 120, the piston 110 and attached actuating element 112 will be moved upwardly until an end 112b of the actuating element 112 engages the bottom 102a of the adjustment screw 102. Therefore, this will set the maximum stroke of the valve stem 60 which will raise or lift off of the valve seat 62 by the same distance.

The piston 110 includes a wiper 110a that engages the internal wall 120a of the cylindrical piston chamber 120 in a dynamic sealing fashion to ensure that the pressurized actuating air is sealed between the wiper 110a and the dynamic seal 116 mounted within the dispenser body 12 and axially aligned with the valve stem 60 and the actuating element 112. As further shown in FIG. 2, an air supply passage 140 for supplying pressurized process air is also provided in the dispenser body 12 and receives air through the fitting 34. Passage 140 communicates with a passage in the form of a groove 142 on the upper side of the dispensing element body 52. This groove 142 is in fluid communication with another air passage 144 and, ultimately, with an opening 146 in the cap 54 to create a curtain of pressurized air in surrounding relation to the dispensing tip 62b, as will be described further below. The opening 146 has a diameter sufficiently larger than the outer diameter of the dispensing tip 62b so as to create the desired air annulus and discharged air curtain. For example the air annulus may be approximately 0.005".

Figure 3:
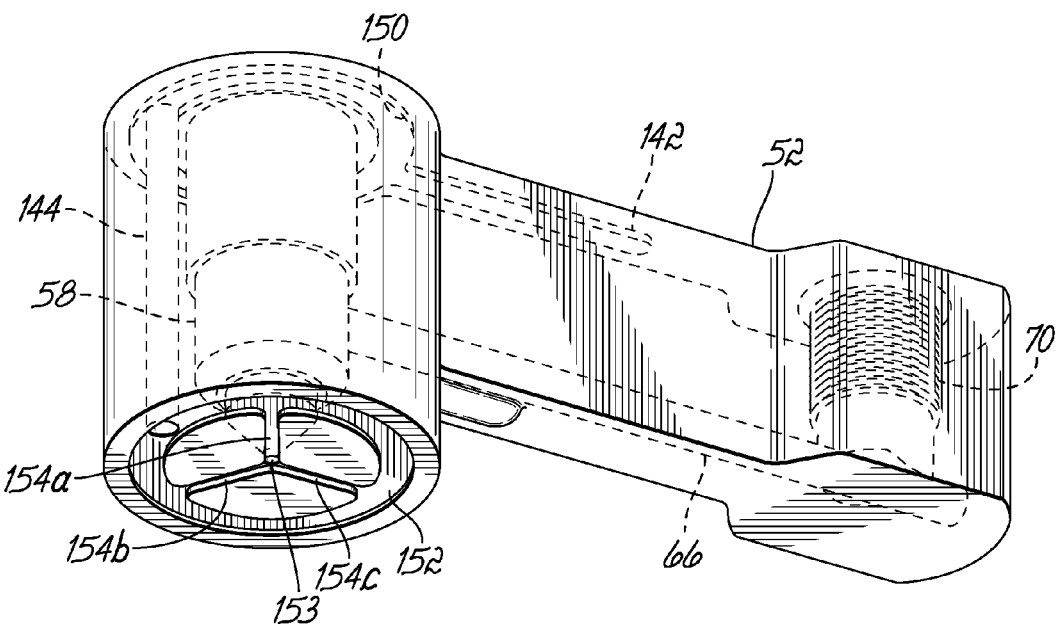
FIG. 3 is a bottom perspective view of a dispensing element body associated with the dispenser of FIG. 1.
Figure 4:
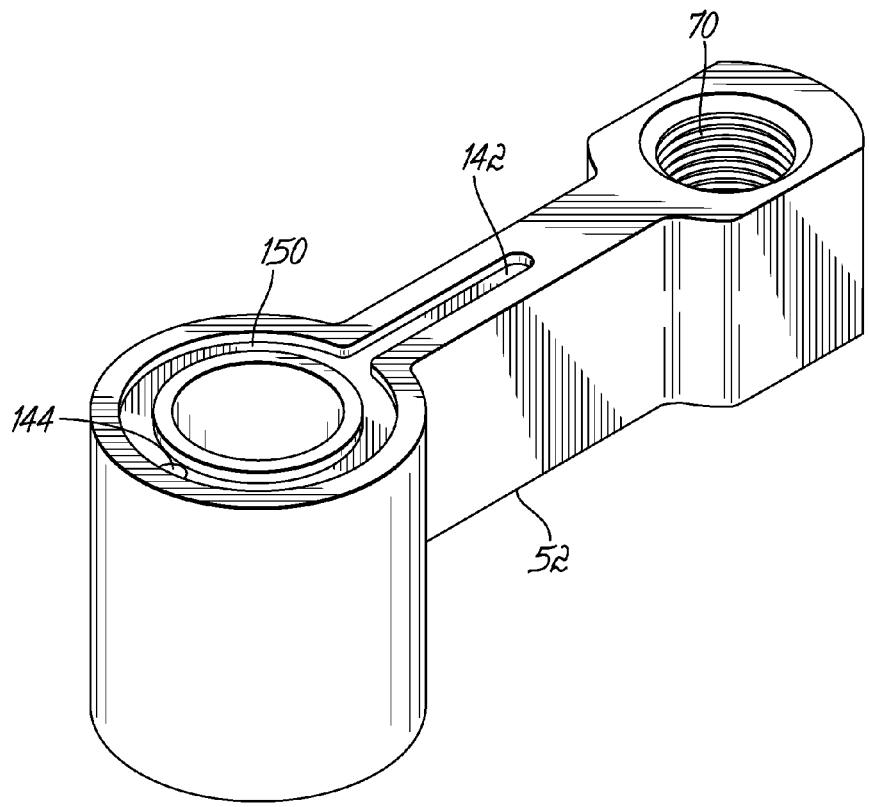
FIG. 4 is a top perspective view of the dispensing element body shown in FIG. 3.

FIGS. 3 and 4 illustrate the dispensing element body 52 in greater detail, including the various process air passages. Referring now to FIGS. 2-4, the air supply groove 142 communicates and connects with an annular groove 150 in the dispensing element body 52 that surrounds the guide element 76. This annular groove 150 communicates with the vertical air supply passage 144 which, in turn, communicates with an annular groove 152 on the underside of the dispensing element body 52 in surrounding relation to an opening 153 that receives the dispensing tip 62b of the valve seat 62 in a sealing manner, such as by being adhesively secured therein. The annular or ring shaped groove 152 communicates with the central opening 146 (FIG. 2) via three connecting grooves 154a, 154b, 154c. Grooves 152, 154a, 154b, 154c on the underside of the dispensing element body 52 as well as grooves 142, 150 on the top of the dispensing element body 52 form passages when the cap 54 is tightly secured to the dispenser body 12 as shown in FIG. 2. In this regard, the bottom surface 12a of the dispenser body 12 closes the open, upper sides of the grooves 142, 150, and the inner surface 54a of the cap 54 closes the open, lower sides of the grooves 152, 154a, 154b, 154c. The pressurized process air is directed from the annular groove 152 and connecting grooves 154a, 154b, 154c to the opening 146 in the cap 54 that receives the dispensing tip 62b (FIG. 2).

Figure 5:
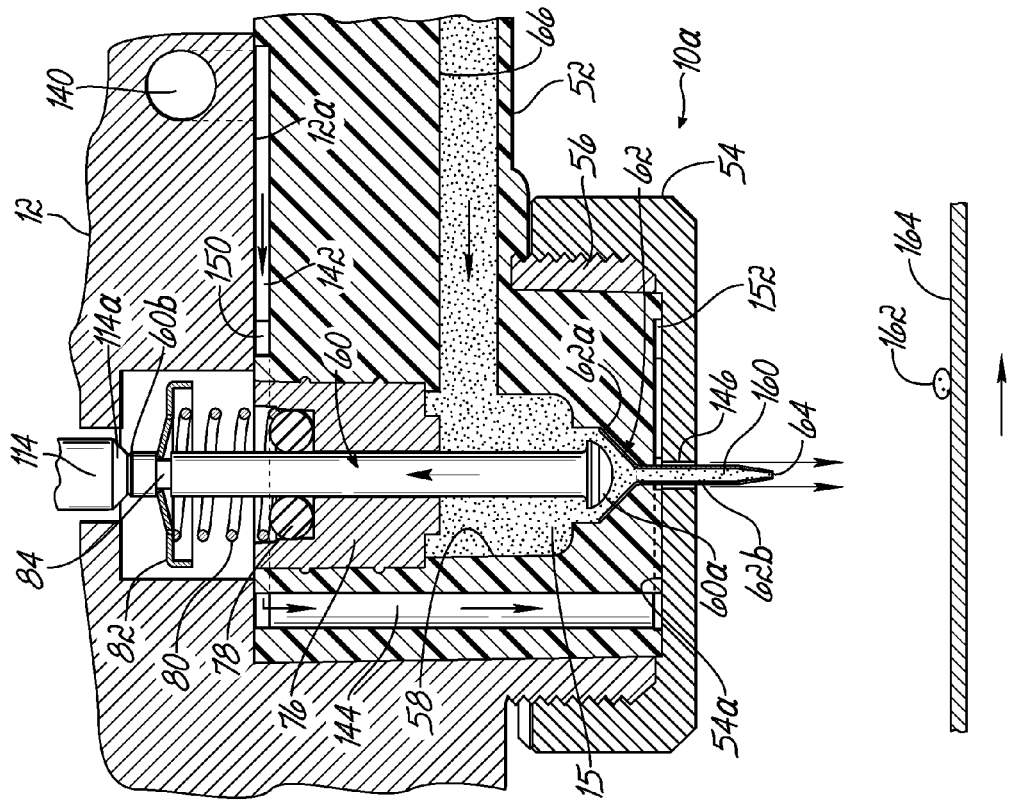
FIG. 5 is a cross sectional view similar to FIG. 2, but showing an enlarged view of the dispensing portion of the dispenser while ejecting a small amount of liquid.
Figure 6:
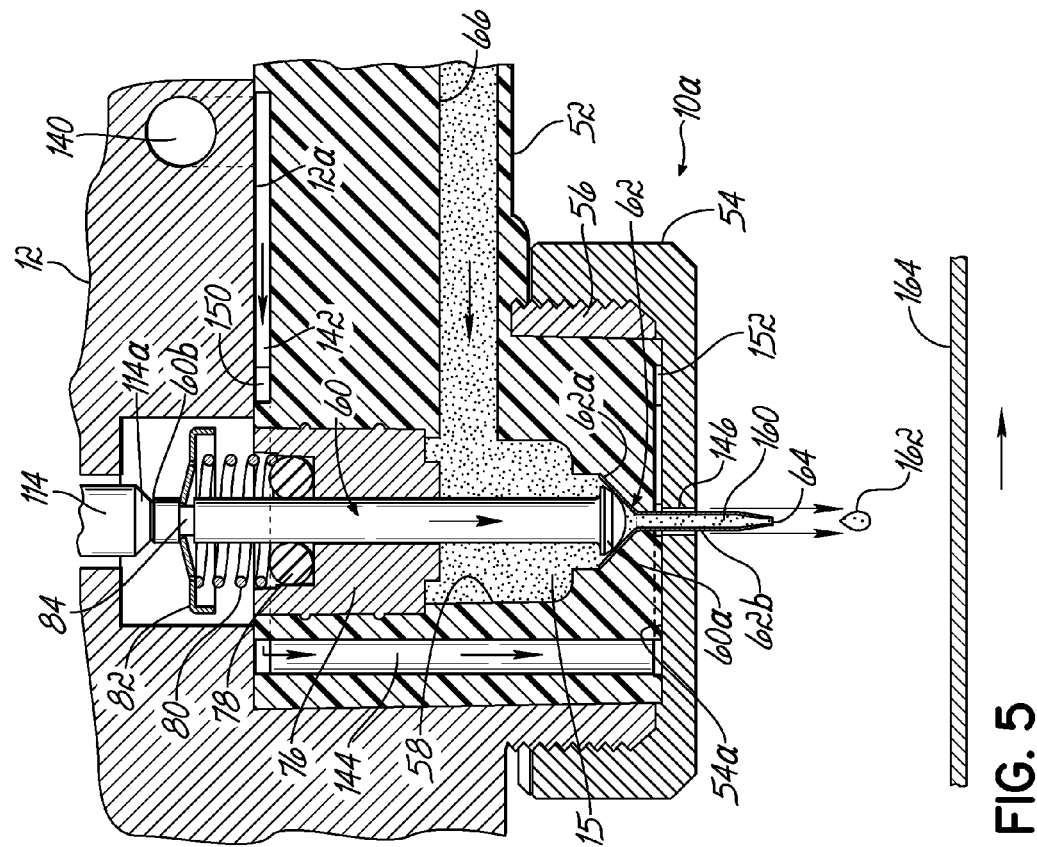
FIG. 6 is a cross sectional view similar to FIG. 5, but illustrating a subsequent point in the dispensing process.

FIGS. 5 and 6 illustrate the operation of the valve stem 60 and the use of the process air while dispensing a small amount of liquid 15, such as an epoxy or other liquid of greater or lesser viscosity. FIG. 5 illustrates both the initial and ending positions of the valve stem tip 60a during a dispense cycle. As shown in FIG. 6, the valve stem 60 is initially moved to disengage the valve stem tip 60a and space the valve stem tip 60a from the valve seat 62 as shown. This allows the viscous liquid 15, which is under pressure, to fill any void that is within the liquid passage 160 communicating with the outlet 64. As previously described, the valve stem 60 is raised or disengaged from the valve seat 62 by introducing pressurized actuating air into the piston chamber 120 (FIG. 2). To dispense a small amount of the liquid 15, such as a drop 162, the actuating air is exhausted from the piston chamber 120 and the return spring 104 and attached actuating element 112 force the valve stem 60 downward such that the tip 60a engages the valve seat 62 and forces a discrete and accurate amount of the liquid 15 onto the substrate 164. During the dispense cycle, process air is discharging through the opening 146 of the cap 54 surrounding the dispense tip 62b to create a curtain of air that contains and/or reduces the formation of any small amounts of satellite liquid associated with the drop 162. At the end of the dispense cycle, the valve stem tip 60a is maintained in the closed position as shown in FIG. 5 such that, between dispense cycles, the liquid 15 in the passage 160 communicating with the outlet 64 is not under pressure that would potentially cause leakage from the outlet 64 between the dispense cycles. The dispenser 10 may be operated to rapidly dispense small amounts of liquid 15, on the order of about 0.02 microliter to about 0.1 microliter at a rate of 100 Hz or less, although these parameters may be adjusted depending on the application and the specific embodiment of the invention practiced.

Figure 7:
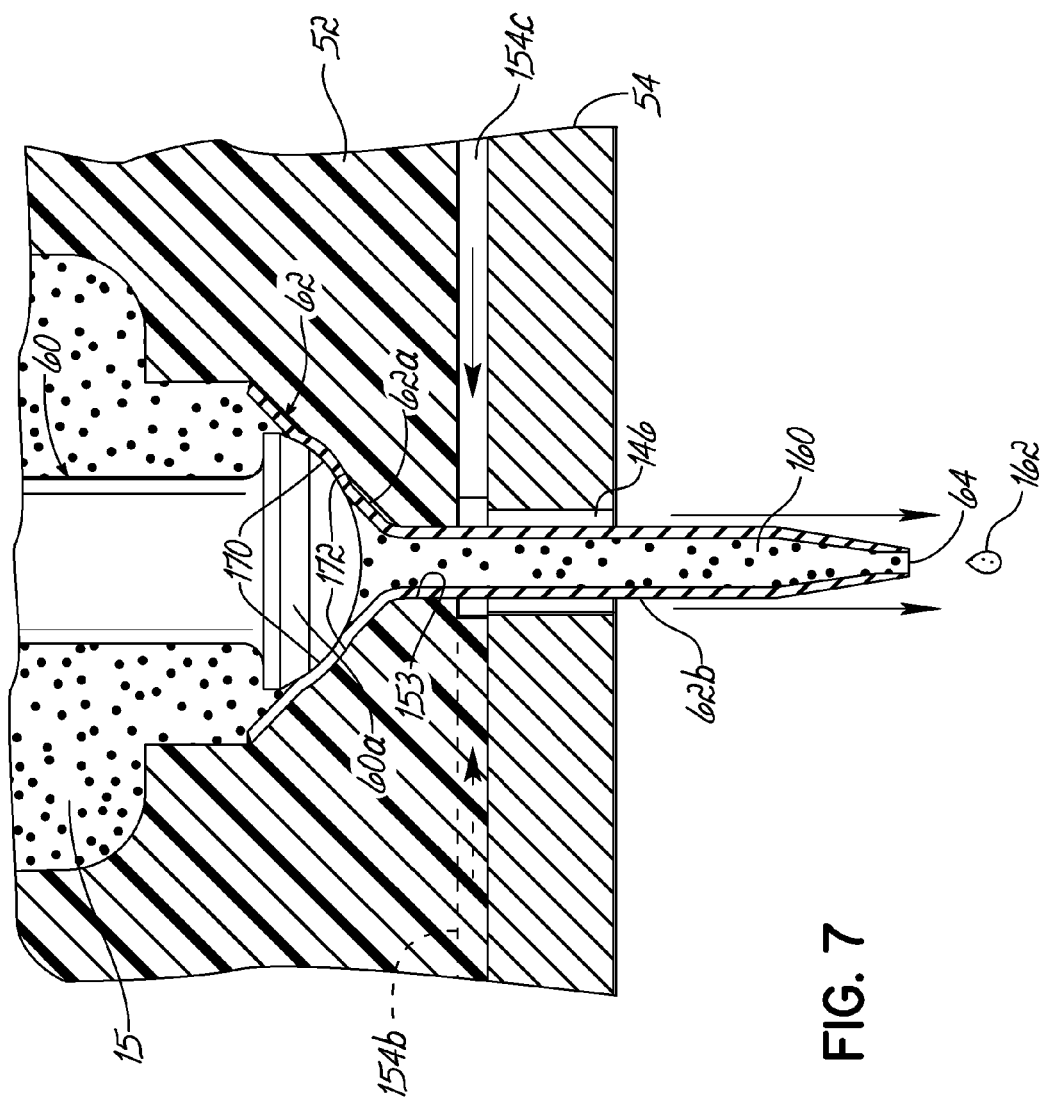
FIG. 7 is a cross sectional view similar to FIGS. 5 and 6, but further enlarged to show details of the valve stem tip and valve seat in the closed position.

As best shown in FIG. 7, the valve stem tip 60a engages the valve seat 62 in the closed position and forms plastic deformations 170, 172 in a cone shaped portion 62a of the valve seat 62 and the underlying material of the dispensing element body 52. The valve seat 62 is formed by a deep drawing process from a thin and malleable metal, such as ductile stainless steel having a thickness between about, for example, 0.0015" and about 0.0025". The underlying material of the dispensing element body may be any suitable plastic, such as polypropylene which is generally rigid but, under impact will plastically deform to a slight degree. The two materials are therefore of different hardness, but with each being plastically deformable. The material (e.g., stainless steel) in direct contact with the valve stem tip 60a is harder than the underlying material (e.g., plastic). This provides the combined benefit of wear resistance at the direct interface of the valve stem tip 60a and the valve seat 62, and a damping effect at the underlying, softer material. The dispensing element body 52 may be manufactured in a cost effective manner, such as by injection molding. The deformation, as shown in FIG. 7, will be concave and annular when the valve stem tip 60a is convexly curved as shown. This will form an annular concave ring of deformation that creates an area of sealing contact between the valve stem tip 60a and the metal, cone shaped portion 62a and damps the impact of the tip 60a against the metal, cone shaped portion 62a to decrease atomization of the liquid 15 as it discharges from the outlet 64.

Figure 7A:
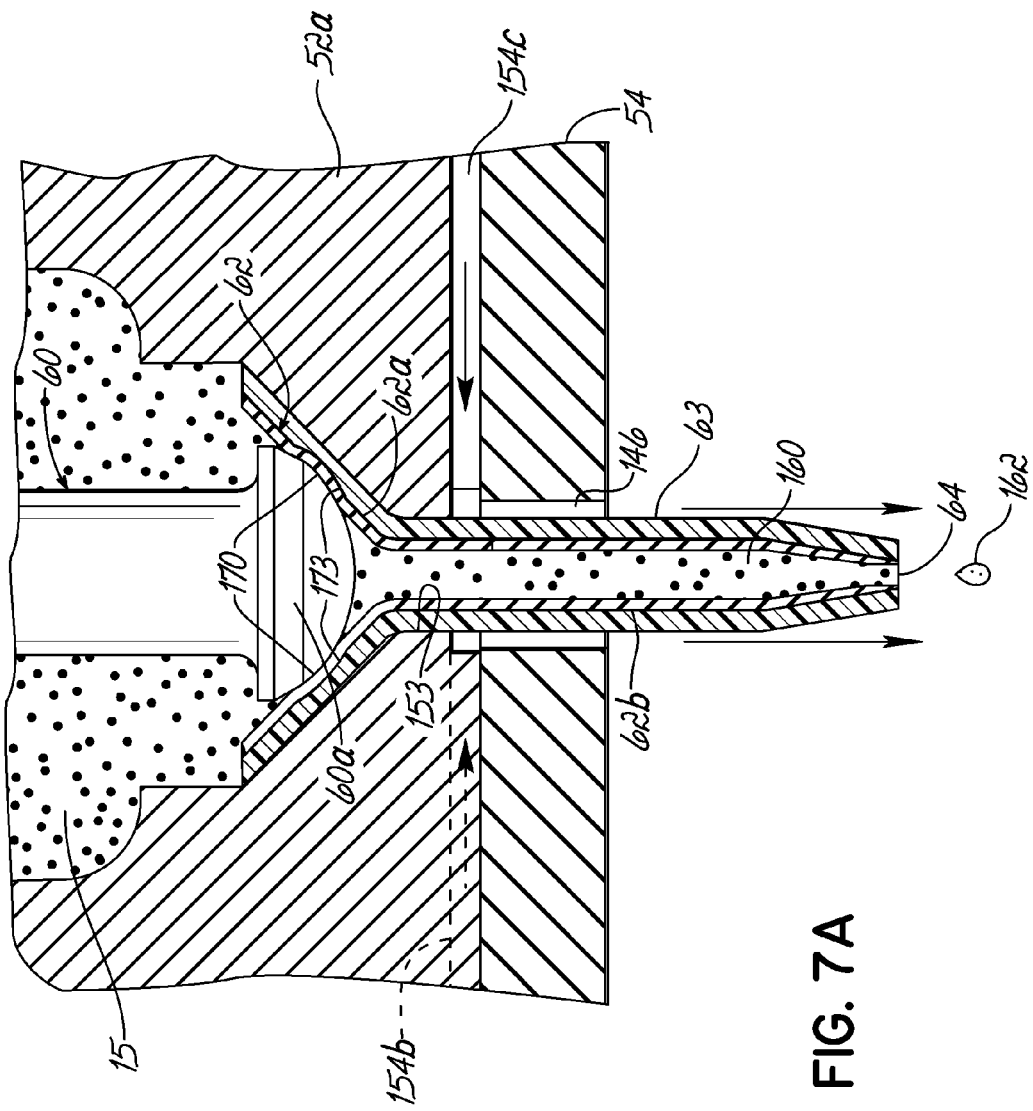
FIG. 7A is a cross sectional view similar to FIG. 7, but illustrating an alternative embodiment.
Figure 8:
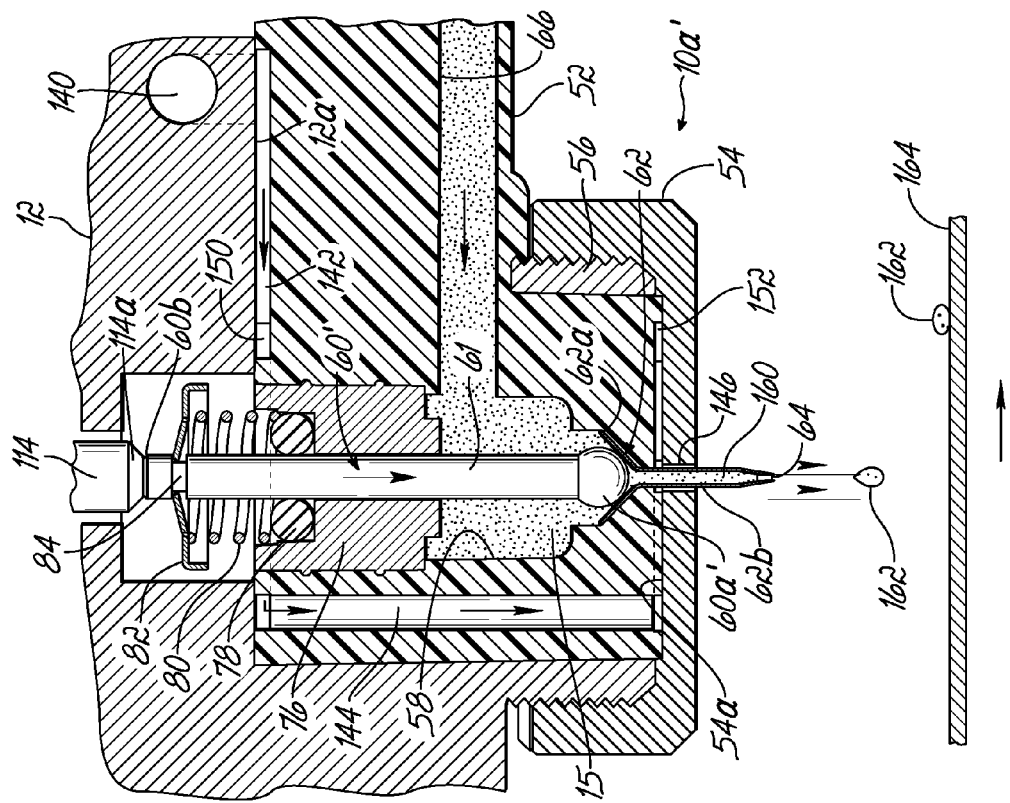
FIG. 8 is a cross sectional view similar to FIG. 5, but illustrating an alternative embodiment of the valve stem in the open position.
Figure 9:
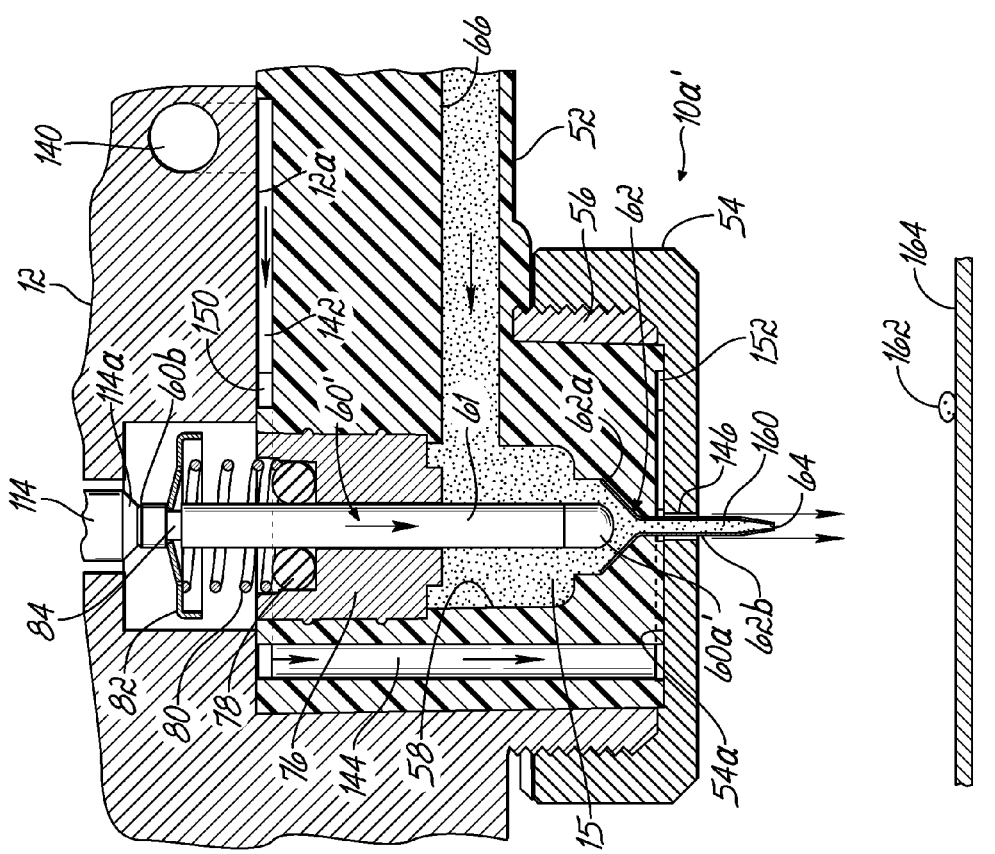
FIG. 9 is a cross sectional view similar to FIG. 8, but showing the valve stem of FIG. 8 in the closed position.
Figure 10:
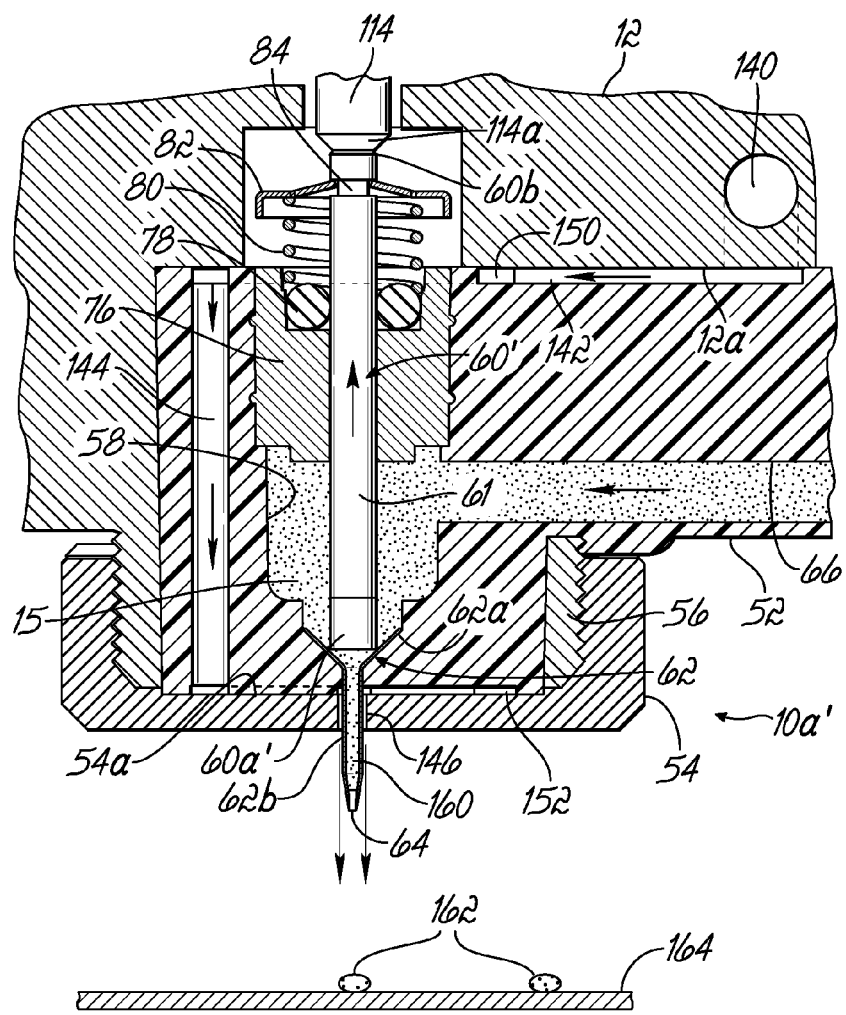
FIG. 10 is a cross sectional view similar to FIGS. 8 and 9, but illustrating the valve stem in a transitioning position between the open and closed positions.

FIG. 7A illustrates an alternative embodiment in which all like reference numerals in FIG. 7A, as compared to FIG. 7, refer to like structure and therefore require no further discussion. In this embodiment, an outer, plastically deformable layer 63, such as a layer formed of plastic material, is carried on at least the cone-shaped portion 62a of the valve seat 62. This layer 63 may further extend along the dispensing tip 62b. This two-layered construction therefore allows the dispensing element body 52a to be formed from a rigid material, such as a metal, if desired. The two-layered construction 62, 63 may be formed by using the above-mentioned deep drawing process to form the valve seat 62 from a thin and malleable metal such as stainless steel as discussed above. The outer layer 63 may be formed from a relatively rigid plastic, such as polypropylene, that will plastically deform to a slight degree, as shown in FIG. 7A, after impact by the valve stem tip 60a. The plastic layer 63 may be overmolded onto the valve seat 62 or adhered to the valve seat 62 in any other suitable manner. Thus, the result is the same as shown and described in connection with the embodiment of FIG. 7. Namely, annular concave rings of deformation 170, 173 will be formed, respectively, in the cone-shaped portion 62a of the valve seat 62, as well as the underlying plastic material 63. This will damp the impact of the tip 60*a* against the metal, cone-shaped portion 62*a* to decrease atomization of the liquid 15 as it discharges from the outlet 64.

FIGS. 8, 9 and 10 illustrate an alternative embodiment of the dispensing element in which the valve seat 62 need not deform. In this embodiment, all elements and associated functions that are identical to the previous embodiment are referred to with like reference numerals and, therefore, the same description applies and need not be repeated. Reference numerals with prime marks (') correspond to like elements of the previous embodiment with the same reference numeral, but modified as described. The difference between this embodiment and the previous embodiment is that the dispensing portion 10*a*' includes a valve stem 60' with a valve stem tip 60*a*' that is resilient. Although the valve seat 62 is shown with the same structure as in the first embodiment, it will be understood that the valve seat may be simplified since it need not deform and, preferably, does not deform in this embodiment. The valve stem tip 60*a*' may be formed from a material that is elastomeric, such as rubber or another polymer. A main portion 61 of the valve stem 60' may be formed from a metal. The valve stem tip 60*a*' may be suitably secured to the end of the main portion 61, such as by using an adhesive or over-molding process. One manner of using the valve stem 60' and elastomeric tip 60*a*' is shown in the process of FIG. 8-10. The valve stem 60' may initially be spaced from the valve seat 62 and moved downwardly in the manner previously described such that the valve stem tip 60*a*' deforms into a shape, such as that shown in FIG. 9 as a small amount of the liquid 15 is forced through the passage 160 and the outlet 64. FIG. 10 illustrates a position of the valve stem 60' in which the tip 60*a*' is in transition and the valve stem 60' is moving upwardly during a dispense cycle. It will be appreciated that while it is preferred that the valve stem tip 60 or 60' remain in the closed position between dispense cycles as previously described to prevent leaking, depending on the parameters such as the pressure of the liquid 15 and the viscosity of the liquid 15, it may be possible to start the dispense cycle with the valve stem 60 or 60' in the open position.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A dispenser for applying small amounts of liquid to a substrate, the dispenser comprising:

a dispenser body;

a valve stem mounted for reciprocating movement within said dispenser body, said dispenser body further including a liquid chamber and said valve stem including a tip mounted for reciprocating movement within said liquid chamber between open and closed positions; and a valve seat in said dispenser body engaging said valve stem tip in the closed position, wherein said valve stem tip is formed from an elastomeric material, said valve stem tip being deformed against said valve seat when said valve stem moves to the closed position thereby damping impact of said valve stem tip against said valve seat and forming an area of sealing contact between said valve stem tip and said valve seat.

2. The dispenser of claim 1, wherein said valve stem further includes a main portion coupled with said tip, said main portion formed from a rigid metal.

3. The dispenser of claim 1, wherein said dispensing body further comprises a dynamic seal engaging said valve stem and preventing escape of liquid from said liquid chamber, said valve stem extending through said dynamic seal such that an end of said valve stem opposite said tip is positioned outwardly of said liquid chamber for engagement with an actuator.

4. The dispenser of claim 1, wherein said valve seat further comprises a cone shaped portion for engaging said valve stem tip and an elongate tip portion including a liquid dispensing passage communicating with said liquid dispensing outlet.

5. The dispenser of claim 4, wherein when said valve stem moves to the closed position, said valve step tip first contacts said cone shaped portion of said valve seat to form the area of sealing contact, and then said valve stem tip further deforms outwardly toward said elongate tip portion and said liquid dispensing passage of said valve seat to positively displace liquid through said liquid dispensing passage onto the substrate.

6. A method of applying a small amount of liquid to a substrate during a dispense cycle, the liquid being dispensed from a dispenser including a valve stem with a tip formed from an elastomeric material, a liquid chamber, a liquid dispensing passage communicating with a liquid dispensing outlet, and a valve seat positioned between the liquid chamber and the liquid dispensing passage, the method comprising:

(a) moving the valve stem tip from a closed position which is engaged with the valve seat to an open position which is disengaged and spaced from the valve seat;

(b) allowing pressurized liquid to flow from the liquid chamber past the valve stem tip and into the liquid dispensing passage;

(c) moving the valve stem tip from the open position to the closed position while dispensing the small amount of liquid onto the substrate;

maintaining the valve stem tip in the closed position while moving the substrate and the dispenser relative to each other to place the dispenser at a new dispensing location; and initiating a subsequent dispense cycle at the new dispensing location of said substrate by repeating steps (a)-(c).

7. The method of claim 6, wherein the valve seat is deformed by the valve stem tip as the valve seat is engaged by the valve stem tip in the closed position.

8. The method of claim 6, wherein the valve stem tip is deformed by the valve seat as the valve stem tip engages the valve seat in the closed position.

9. The method of claim 8, wherein the valve seat does not deform as the valve stem tip engages the valve seat in the closed position.

10. The dispenser of claim 1, wherein said valve seat is formed from a rigid material such that said valve seat does not deform as a result of impacts of said valve stem tip against said valve seat.

* * * * *